US010608861B2

(12) United States Patent
Chen et al.

(10) Patent No.: US 10,608,861 B2
(45) Date of Patent: Mar. 31, 2020

(54) METHOD AND SYSTEM FOR PROCESSING FREQUENCY OFFSET

(71) Applicant: DATANG MOBILE COMMUNICATIONS EQUIPMENT CO., LTD, Beijing (CN)

(72) Inventors: Yuetan Chen, Beijing (CN); Xiaojuan Zhang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 61 days.

(21) Appl. No.: 15/781,467

(22) PCT Filed: Sep. 27, 2016

(86) PCT No.: PCT/CN2016/100219
§ 371 (c)(1),
(2) Date: Jun. 4, 2018

(87) PCT Pub. No.: WO2017/092490
PCT Pub. Date: Jun. 8, 2017

(65) Prior Publication Data
US 2019/0268196 A1 Aug. 29, 2019

(30) Foreign Application Priority Data
Dec. 4, 2015 (CN) .......................... 2015 1 0884498

(51) Int. Cl.
H04L 27/26 (2006.01)
H04W 56/00 (2009.01)

(52) U.S. Cl.
CPC ............ *H04L 27/266* (2013.01); *H04L 27/26* (2013.01); *H04W 56/001* (2013.01)

(58) Field of Classification Search
CPC . H04L 27/0014; H04L 27/26; H04L 27/2655; H04L 27/2657; H04L 27/266; H04W 56/001
See application file for complete search history.

(56) References Cited

U.S. PATENT DOCUMENTS

| 7,068,593 | B2 | 6/2006 | Cho et al. |
| 7,539,241 | B1 | 5/2009 | Dick |
| 2003/0058966 | A1 | 3/2003 | Gilbert et al. |
| 2006/0239370 | A1 | 10/2006 | Mody et al. |

(Continued)

FOREIGN PATENT DOCUMENTS

CN 102546485 A 7/2012

*Primary Examiner* — Khoa Huynh
(74) *Attorney, Agent, or Firm* — Bayramoglu Law Offices LLC

(57) ABSTRACT

The present invention discloses a method and system for processing frequency offset, the method includes: obtaining a current frequency offset state; determining whether the current frequency offset state is consistent with a historical effective frequency offset state; wherein the historical effective frequency offset state is a frequency offset state corresponding to a correct decoding result; if it is determined yes, performing a pre-compensation to a fine frequency offset estimation according to the historical effective frequency offset state. The present application solves the problem that inaccurate frequency offset estimation makes it unable to perform frequency offset compensate.

18 Claims, 4 Drawing Sheets

(56) References Cited

U.S. PATENT DOCUMENTS

| | | |
|---|---|---|
| 2008/0137563 A1 | 6/2008 | Wang |
| 2008/0273641 A1 | 11/2008 | Yang et al. |
| 2012/0115423 A1* | 5/2012 | Sang .................. H04L 27/2657 |
| | | 455/75 |
| 2017/0279645 A1* | 9/2017 | Lu ....................... H04L 27/0014 |

* cited by examiner

METHOD AND SYSTEM FOR PROCESSING FREQUENCY OFFSET

CROSS-REFERENCE TO RELATED APPLICATIONS

This application is the national phase entry of International Application No. PCT/CN2016/100219 filed Sep. 27, 2016, which is based upon and claims the priority to Chinese Patent Application No. CN201510884498.7, filed Dec. 4, 2015, the entirety of which are incorporated herein by reference.

TECHNICAL FIELD

The present application relates to the technical field of communication, in particular to a method for processing frequency offset.

BACKGROUND

Due to the frequency offset between the transmitting device and the receiving device, and the Doppler shift caused by the movement of the transmitting device in the wireless communication system, the frequency between the carrier frequency received by the receiving device and the frequency of the local crystal oscillator are present, it is named frequency offset. Especially in an area of a high-speed railway, which covered by a mobile communication system, the device (user equipment) has a high moving speed (e.g. in an area of a high-speed railway, which covered by a mobile communication system, the moving speed of the devices are generally more than 300 km/h). It brings about a serious Doppler effect. The maximum Doppler frequency can be reached more than 1500 Hz, which caused the deviation of the base state's frequency adoption, and the serious constellation point's phase rotation of equalizer's outputs, it leads to incorrect demodulation and decoding of equalizer.

Current methods for eliminating the frequency offset caused by the Doppler Effect are: estimation of the frequency offset, compensation of the sampling deviation, and phase rotation, in order to eliminate the influence of the Doppler shift as much as possible. For instance, it utilizes a cyclic prefix for coarse frequency offset estimation and pre-compensation. However, the signal/noise ratio in the actual environment cannot be guaranteed, the error of the coarse frequency offset estimation is huge, or even invalid, and the frequency offset cannot be accurately compensated.

SUMMARY

The application provides a method and system for processing frequency offset to solve the problem that the frequency offset is not accurate so that the frequency offset compensation is not accurate.

In order to solve the problem above, a method for processing frequency offset is provided, which comprises: obtaining a current frequency offset state; determining whether the current frequency offset state is consistent with a historical effective frequency offset state; wherein the historical effective frequency offset state is a frequency offset state corresponding to a correct decoding result; if it is determined yes, performing a pre-compensation to a fine frequency offset estimation according to the historical effective frequency offset state.

Preferably, the step of determining whether the current frequency offset state is consistent with a historical effective frequency offset state comprises: determining whether a current antenna state is consistent with a historical effective antenna state; and determining whether a difference between a current half-frame number and a historical effective half-frame number matches a first threshold value; and determining whether a historical effective frequency offset estimating value is set to be invalid; wherein the current frequency offset state comprises: the current antenna state and the current half-frame number, the historical effective frequency offset state comprises: the historical effective antenna state, the historical effective half-frame number and the historical effective frequency offset estimating value.

Preferably, the step of performing a pre-compensation to a fine frequency offset estimation according to the historical effective frequency offset state comprises: using the historical effective frequency offset estimating value to perform the pre-compensation to the fine frequency offset estimation.

Preferably, if the current antenna state is not consistent with the historical effective antenna state, or the difference between the current half-frame number and the historical effective half-frame number does not match the first threshold value, setting the historical effective frequency offset estimating value to be invalid.

Preferably, the method further comprising: if the current frequency offset state is not consistent with the historical effective frequency offset state, determining whether a current pilot frequency signal/noise ratio matches a second threshold value; if yes, adopting an amplitude limiting compensation strategy to perform a pre-compensation to the fine frequency offset estimation.

Preferably, adopting an amplitude limiting compensation strategy to perform a pre-compensation to the fine frequency offset estimation comprises: performing a coarse frequency offset estimation to obtain a coarse frequency offset estimation result; determining whether the coarse frequency offset estimation result matches actual frequency offset range; if yes, performing a pre-compensation to the fine frequency offset estimation according to the coarse frequency offset estimation result; if no, performing an amplitude-limiting on the coarse frequency offset estimation result to obtain an amplitude-limiting result, and performing a pre-compensation to the fine frequency offset estimation according to the amplitude-limiting result.

Preferably, the method further comprising: if the pilot frequency signal/noise ratio does not match the second threshold value, determining whether the current frequency offset state is consistent with a historical frequency offset state; if yes, adopting a frequency domain continuation compensation strategy to perform the pre-compensation to the fine frequency offset.

Preferably, determining whether the current frequency offset state is consistent with a historical frequency offset state comprises: determining whether the current antenna state is consistent with the historical antenna state; and determining whether the difference between the current half-frame number and the historical frame number matches a third threshold value; and determining whether the historical frequency offset estimating value is set to be invalid; wherein the current frequency offset state comprises: the current antenna state and the current half-frame number; the historical frequency offset state comprises: the historical antenna state, the historical half-frame number and the historical frequency offset estimating value.

Preferably, the adopting a frequency domain continuation compensation strategy to perform the pre-compensation to the fine frequency offset comprises: performing a frequency domain continuation to the historical frequency offset estimating value; according to the result of the frequency domain continuation, performing the pre-estimation to the fine frequency offset estimation.

Preferably, the method further comprising: if the current antenna state is not in consistent with the historical antenna state, or the difference between the current half-frame number and the historical half-frame number does not match the third threshold value, setting the historical frequency offset estimating value to be invalid.

Preferably, the method further comprising: if the current antenna state is not in consistent with the historical antenna state, not performing the pre-compensation to the fine frequency offset estimation.

Preferably, the method further comprising: performing a fine frequency offset estimation and obtaining a fine frequency offset estimation result; obtaining a final frequency offset estimation result according to the fine frequency offset estimation result; wherein the final frequency offset estimation result comprises: a final antenna state, a final half-frame number and a final frequency offset estimating value; determining whether a decoded data obtained after performing the final frequency offset estimation result is correct; if yes, updating the historical effective frequency offset state according to the final antenna state, the final half-frame number and the final frequency offset estimating value; if no, updating the historical frequency offset state according to the final antenna state, the final half-frame number and the final frequency offset estimating value.

The present application further disclose a system for processing frequency offset, comprising: a first obtaining module, configured to obtain a current frequency offset state; a first determining module, configured to determine whether the current frequency offset state is consistent with a historical effective frequency offset state; wherein the historical effective frequency offset state is a frequency offset state corresponding to a correct decoding result; a first performing module, configured to, if it is determined yes, perform a pre-compensation to a fine frequency offset estimation according to the historical effective frequency offset state.

Preferably, the first determining module is configured to: determine whether a current antenna state is consistent with a historical effective antenna state; and determine whether a difference between a current half-frame number and a historical effective half-frame number matches a first threshold value; and determine whether a historical effective frequency offset estimating value is set to be invalid; wherein the current frequency offset state comprises: the current antenna state and the current half-frame number, the historical effective frequency offset state comprises: the historical effective antenna state, the historical effective half-frame number and the historical effective frequency offset estimating value.

Preferably, the operation of performing a pre-compensation to a fine frequency offset estimation according to the historical effective frequency offset state by the first performing module comprises: using the historical effective frequency offset estimating value to perform the pre-compensation to the fine frequency offset estimation.

Preferably, the system further comprising: a second performing module, configured to, if the current antenna state is not consistent with the historical effective antenna state, or the difference between the current half-frame number and the historical effective half-frame number does not match the first threshold value, set the historical effective frequency offset estimating value to be invalid.

Preferably, the method further comprising: a second determining module, configured to, if the current frequency offset state is not consistent with the historical effective frequency offset state, determine whether a current pilot frequency signal/noise ratio matches a second threshold value; a third performing module, configured to, if the current pilot frequency signal/noise ratio matches a second threshold value, adopt an amplitude limiting compensation strategy to perform a pre-compensation to the fine frequency offset estimation.

Preferably, the operation of adopting an amplitude limiting compensation strategy to perform a pre-compensation to the fine frequency offset estimation by the third performing module comprises: performing a coarse frequency offset estimation to obtain a coarse frequency offset estimation result; determining whether the coarse frequency offset estimation result matches actual frequency offset range; if yes, performing a pre-compensation to the fine frequency offset estimation according to the coarse frequency offset estimation result; if no, performing an amplitude-limiting on the coarse frequency offset estimation result to obtain an amplitude-limiting result, and performing a pre-compensation to the fine frequency offset estimation according to the amplitude-limiting result.

Preferably, the system further comprising: a third determining module, configured to, if the pilot frequency signal/noise ratio does not match the second threshold value, determine whether the current frequency offset state is consistent with a historical frequency offset state; a fourth performing module, configured to, if the current frequency offset state is consistent with the historical frequency offset state, adopt a frequency domain continuation compensation strategy to perform the pre-compensation to the fine frequency offset.

Preferably, the third determining module is configured to determine whether the current antenna state is consistent with the historical antenna state; and determine whether the difference between the current half-frame number and the historical frame number matches a third threshold value; and determine whether the historical frequency offset estimating value is set to be invalid; wherein the current frequency offset state comprises: the current antenna state and the current half-frame number; the historical frequency offset state comprises: the historical antenna state, the historical half-frame number and the historical frequency offset estimating value.

Preferably, the operation of adopting a frequency domain continuation compensation strategy to perform the pre-compensation to the fine frequency offset by the fourth performing module comprises: performing a frequency domain continuation to the historical frequency offset estimating value; according to the result of the frequency domain continuation, performing the pre-estimation to the fine frequency offset estimation.

Preferably, the system further comprising: a fifth performing module, configured to, if the current antenna state is not in consistent with the historical antenna state, or the difference between the current half-frame number and the historical half-frame number does not match the third threshold value, set the historical frequency offset estimating value to be invalid.

Preferably, the system further comprising: a sixth performing module, configured to, if the current antenna state is not in consistent with the historical antenna state, not perform the pre-compensation to the fine frequency offset estimation.

Preferably, the system further comprising: a calculating module, configured to, perform a fine frequency offset estimation, and obtain the fine frequency offset estimation result; a second obtaining module, configured to, obtain a final frequency offset estimation result according to the fine frequency offset estimation result; wherein the final frequency offset estimation result comprises: a final antenna state, a final half-frame number and a final frequency offset estimating value; a fourth determining module, configured to, determine whether a decoded data obtained after performing the final frequency offset estimation result is correct; an updating module, configured to, if the decoded data is correct, update the historical effective frequency offset state according to the final antenna state, the final half-frame number and the final frequency offset estimating value; and if the decoded data is incorrect, update the historical frequency offset state according to the final antenna state, the final half-frame number and the final frequency offset estimating value.

The present application further disclose a computer readable medium storing programs for executing the method above.

Compared with the prior art, the present application comprises the following advantages:

In the method for processing frequency offset described in this application, a comparison between the current frequency offset state and the historical effective frequency offset state may be obtained, and whether the current frequency offset state is consistent with a historical effective frequency offset state is determined; if it is determined yes, performing a pre-compensation to a fine frequency offset estimation according to the historical effective frequency offset state. Since the historical effective frequency offset state is a frequency offset state corresponding to a correct decoding result, which guarantees the accuracy of the pre-compensation, and then the fine frequency offset estimation is performed after the pre-compensation according to the pre-compensation result, the problem of inaccurate or unacceptable frequency offset compensation due to the error of the coarse frequency offset estimation is overcome, the accuracy and stability of the frequency offset estimation are improved, and the complexity of the computation is reduced in a certain extent, and overall upstream throughput is improved in high-speed scenarios.

DETAILED DESCRIPTION OF THE EMBODIMENTS

To make one of the above purposes, features and advantages of the present application more apparent and easily understood, the present application will be further explained in detail in combination with the drawings and detailed embodiments below.

In the PUSCH (Physical Uplink Shared Channel), two slot times of each subframe have a pilot in the frequency domain, and each slot time interval is 0.5 ms. It is determined that if the estimation results of two pilot channels are used for calculation for the frequency offset estimation, the maximum range of frequency offset estimation is: −1000 Hz to +1000 Hz, it is not wide enough to cover the range of the Doppler frequency.

Therefore, a combination of coarse frequency offset estimation and fine frequency offset estimation is mostly used in the PUSCH frequency offset estimation scheme. A coarse frequency offset estimation is to use the cyclic prefixes for FFT (Fast Fourier Transformation) windows at different positions for time-domain signals of pilots in the same time slot, to perform FFT calculations. After the compensation of the frequency-domain phase deviation caused by the cyclic shift, the results of twice FFT are used for a sum-operation, the complex angle of the sum-operation's result divided by the difference time between the two FFT window's positions, to get the coarse frequency offset estimation result. The range of the coarse frequency offset estimation result is much larger than the actual frequency offset range.

Fine frequency offset estimation is to use the coarse frequency offset estimation result for the compensation of phase difference caused by frequency offset in the second pilot frequency channel estimation, and then the sum-operation is performed in the frequency-domain channel estimation of the two slot pilots. Gain the complex angle of the sum-operation's result, then the result divided by 0.5 ms, which is the time interval of the pilot of two slots, to obtain the fine frequency offset estimation result. Finally, the addition of the coarse and fine frequency offset estimation result is the final frequency offset estimation result.

Figure 1:
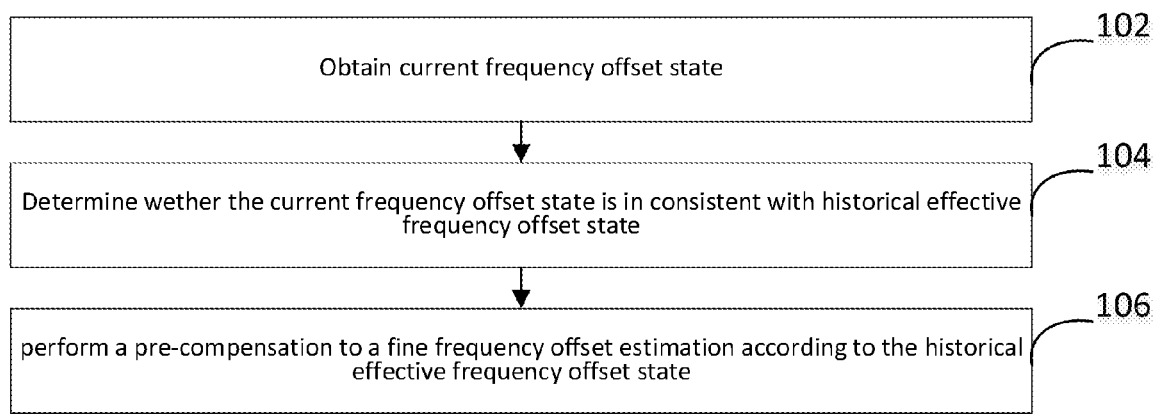
FIG. 1 is a flow path showing a method for processing frequency offset in a first embodiment of the present application.

With reference to FIG. 1, a flow chart of a method for processing frequency offset is shown and the method may comprise following detailed steps as follows.

Step 102, obtaining a current frequency offset state.

Due to the frequency offset between the transmitting device and the receiving device, and the Doppler shift caused by the movement of the transmitting device in the wireless communication system, the frequency between the carrier frequency received by the receiving device and the frequency of the local crystal oscillator are present, it is named frequency offset. In the embodiment, the frequency offset state may be a parameter for indicating the frequency offset, preferably, the frequency offset state comprises but is not limited to: an antenna state and a half-frame number. That is, the current frequency offset state comprises but is not limited to: the current antenna state and the current Half-frame number.

Step 104, determining whether the current frequency offset state is consistent with a historical effective frequency offset state;

In the embodiment, the historical effective frequency offset state is corresponding to the frequency offset state when the decoding result is correct. For instance, if the last users' PUSCH (Physical Uplink Shared Channel) scheduling decoding is correct, it can be considered that the frequency offset estimation result meets the requirement, and then, the frequency offset state corresponding to the last users' accurate PUSCH scheduling decoding is considered as a historical effective frequency offset state.

Step 106, if the current frequency offset state is consistent with the historical effective frequency offset state, performing a pre-compensation to a fine frequency offset estimation according to the historical effective frequency offset state.

In general, the common way of a frequency estimation is: when the coarse frequency offset estimation is finished, the fine frequency offset estimation is performed based on the coarse frequency offset estimation result. In the embodiment, if the current frequency offset state is consistent with the historical effective frequency offset state, the coarse frequency offset estimation may be nit performed, and the fine frequency offset estimation may be pre-compensated directly according to the historical effective frequency offset state, namely, the fine frequency offset estimation is performed after the pre-compensation, to obtain the final frequency offset estimation result, which guarantees the validity and accuracy of the final frequency offset estimation result and improves the efficiency of the processing for frequency offset estimation.

In summary, in the method for processing frequency offset described in the embodiment, a comparison between the current frequency offset state and the historical effective frequency offset state is obtained, and whether the current frequency offset state is consistent with a historical effective frequency offset state is determined; if it is determined yes, performing a pre-compensation to a fine frequency offset estimation according to the historical effective frequency offset state. Since the historical effective frequency offset state is a frequency offset state corresponding to a correct decoding result, which guarantees the accuracy of the pre-compensation, and then the fine frequency offset estimation is performed after the pre-compensation according to the pre-compensation result, the problem of inaccurate or unacceptable frequency offset compensation due to the error of the coarse frequency offset estimation is overcome, the accuracy and stability of the frequency offset estimation are improved, and the complexity of the computation is reduced in a certain extent, and overall upstream throughput is improved in high-speed scenarios.

Second Embodiment

Figure 2:
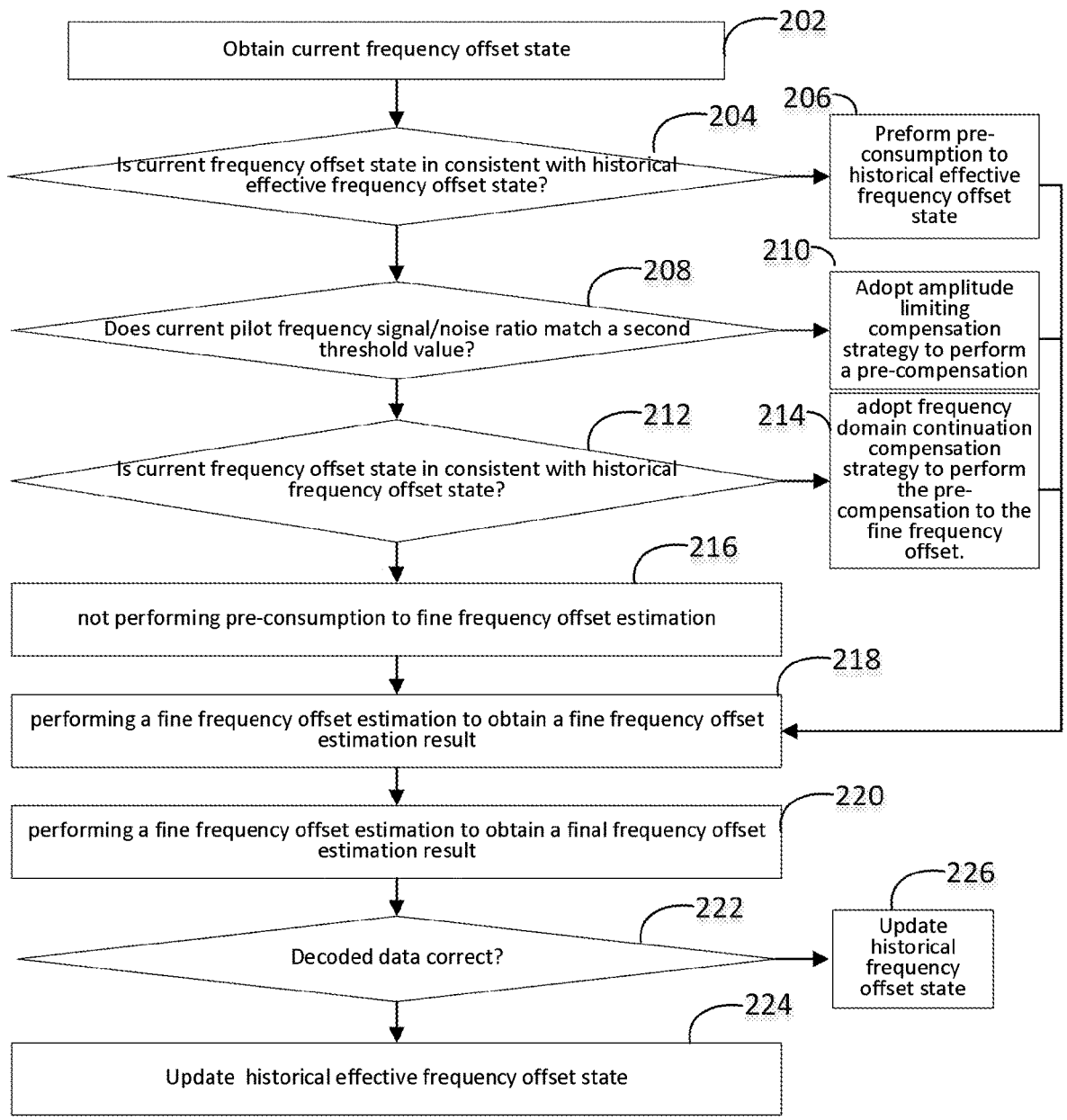
FIG. 2 is a flow path showing a method for processing frequency offset in a second embodiment of the present application.

With reference to FIG. 2, a flow chart of a method for processing frequency offset is shown and the method may comprise steps as follows.

Step 202, obtaining a current frequency offset state;

In the embodiment, the current frequency offset state comprises but is not limited to: a current antenna state and a current half-frame number.

Step 204, determining whether the current frequency offset state is consistent with a historical effective frequency offset state;

In the embodiment, the historical frequency offset state is effective when the decoding result is correct. The historical effective frequency offset state comprises but is not limited to: historical effective antenna states, historical effective half-frame numbers, and historical effective frequency offset estimating values.

Preferably, the step 204 may comprise: determining whether a current antenna state is consistent with a historical effective antenna state; and determining whether a difference between a current half-frame number and a historical effective half-frame number matches a first threshold value; and determining whether a historical effective frequency offset estimating value is set to be invalid; it should be known that above three determining processes are not limited by the described action sequence, or be performed simultaneously, which will not be limited by the embodiment of the present application herein. Wherein the first threshold value can be determined by the actual situation, for instance, the first threshold value comprises but is not limited to: 2, 4, 6, 8, if the difference between the current half-frame number and the historical effective half-frame number is smaller than the first threshold value, then the difference between the current half-frame number and the historical effective half-frame number matches a first threshold value, otherwise the difference between the current half-frame number and the historical effective half-frame number does not match a first threshold value. Wherein, in the embodiment, the half-frame number is used to indicate the time: the half-frame number has a phase difference of 1 and the time difference is 5 ms. For example, the difference between the half-frame numbers is less than 4, indicating that the time difference is less than 20 ms.

In the embodiment, the current antenna state is consistent with the historical effective antenna state, and the difference between the current half-frame number and the historical effective half-frame number matches a first threshold value, and when the historical effective frequency offset estimating value is set to be invalid, the current frequency offset state is consistent with the historical effective frequency offset state; when any the determination result is not satisfied, the current frequency offset state is not consistent with the historical effective frequency offset state.

It should be noted that, when the method for processing frequency offset in the embodiment is performed for the first time, the historical effective frequency offset estimating time, value may be set to be invalid, and the current antenna state and the current half-frame number may be preset to satisfy the requirement (the historical effective frequency offset state), of course, the current antenna state and the current half-frame number may be nit preset to satisfy the requirement (the historical effective frequency offset state), which will not be limited by the embodiment of the present application herein.

Further preferably, in the embodiment, the inconsistency of the current antenna state and the historical effective antenna state is determined by the determining results of the current frequency offset state and historical effective frequency offset state, or, the difference between the current half-frame number and the historical effective half-frame number does not matches the first threshold value, step 228 may also be performed, the historical effective frequency offset estimating value is set to be invalid.

In the embodiment, when the current frequency offset state is consistent with the historical effective frequency offset state, the following step 206 may be performed; otherwise, the following step 208 is performed.

Step 206, performing a pre-compensation to a fine frequency offset estimation according to the historical effective frequency offset state.

In the embodiment, preferably, using the historical effective frequency offset estimating value to perform the pre-compensation to the fine frequency offset estimation, the following step 208 is performed after the pre-compensation.

Step 208, determining whether a current pilot frequency signal/noise ratio matches a second threshold value.

The signal/noise ratio is a major technical indicator to measure the reliability of communication's quality in communication system. According to the different needs of communication, there are different ways of expression. For instance, in digital communication systems, generally, the signal/noise ratio refers to the ratio of the average signal energy of each digital waveform (Bit) at the output of a terminal digital demodulator or decoder to the interference power in the unit frequency band, it is also named normalized signal/noise ratio or energy signal/noise ratio, it is a common indicator. Preferably, in the embodiment, a threshold of the current pilot frequency signal/noise ratio is set, it is also a second threshold value, wherein the second threshold value may be determined by an actual situation, for example, the second threshold value comprises but is not limited to 3, 5, 6 and 9 etc.

In the embodiment, if the current pilot frequency signal/noise ratio is larger than or equal to the second threshold value, that is, the current pilot frequency signal/noise ratio matches the second threshold value, the following step 210 may be performed. If the current pilot frequency signal/noise ratio is smaller than the second threshold value, that is, the current pilot frequency signal/noise ratio does not match the second threshold value, the following step 212 may be performed.

Step 210, adopting an amplitude limiting compensation strategy to perform a pre-compensation to the fine frequency offset estimation.

In the embodiment, a feasible amplitude-limiting compensation strategy may be implemented as follows: performing a coarse frequency offset estimation to obtain a coarse frequency offset estimation result; determining whether the coarse frequency offset estimation result matches actual frequency offset range; if yes, performing a pre-compensation to the fine frequency offset estimation according to the coarse frequency offset estimation result; if no, performing an amplitude-limiting on the coarse frequency offset estimation result to obtain an amplitude-limiting result, and performing a pre-compensation to the fine frequency offset estimation according to the amplitude-limiting result. Preferably, the following step 218 may be performed after pre-compensation.

It should be known that the actual frequency offset range may be determined by the environment in which the device (user equipment) is located, for example, it may be determined, but not limited, by the speed (vehicle speed) and the frequency band of the device. Take a train on a high-speed railway as an example, generally, the speed of the train reaches 360 km/h, when the frequency band is around f=2 GHz, that is, v=100 m/s. Assuming that the actual frequency offset is g, then $g=2*f*v/c=1333$ Hz, light speed is $c=3*10^8$ m/s. If the speed of the high-speed rail is further increased, the actual frequency offset g is greater. For instance, if the speed of a train on the high-speed rail reaches 432 km/h, the calculated actual frequency offset g=1600 Hz. In the embodiment, any appropriate and reasonable actual frequency offset range can be determined by the actual frequency offset calculation result g. If the coarse frequency offset estimation result is in the actual frequency offset range, the fine frequency offset estimation may be directly pre-compensated based on the coarse frequency offset estimation result, and otherwise, an amplitude-limiting is performed on the coarse frequency offset estimation result, so that the amplitude-limiting result is in the actual frequency offset range.

Step 212, determining whether the current frequency offset state is consistent with a historical frequency offset state.

In the embodiment, historical frequency offset state may be a frequency offset state, which is corresponding to the historical frequency offset estimation, it is different from the historical effective frequency offset state, in the embodiment, and the historical frequency offset state may be a frequency offset state, which is corresponding to the inaccurate decoding result. The historical frequency offset state comprises but is not limited to: historical antenna state, historical half-frame number, and historical frequency offset estimating value.

Preferably, the step of determining whether the current frequency offset state is consistent with a historical frequency offset state comprises: determining whether the current antenna state is consistent with the historical antenna state; and determining whether the difference between the current half-frame number and the historical frame number matches a third threshold value; and determining whether the historical frequency offset estimating value is set to be invalid.

It should be noted that above three determining processes are not limited by the described action sequence, or be performed simultaneously, which will not be limited by the embodiment of the present application herein. Wherein the third threshold value may be determined by the actual conditions, for example, the third threshold value may include but is not limited to 2, 4, 6, and 8 and the like.

In the embodiment, when the current antenna state is consistent with the historical antenna state, and the difference between the current half-frame number and the historical half-frame number matches the third threshold value, and the historical frequency offset estimating value is not set to be invalid, it can be considered that the current frequency offset state is consistent with the historical frequency offset state. When any determination result is not satisfied, the current frequency offset state is inconsistent with the history frequency offset state.

It should be known that, when the method for processing frequency offset in the embodiment is performed for the first time, the historical frequency offset estimating value may be set to be invalid, and the current antenna state and the current half-frame number may be preset to satisfy the requirement (the historical frequency offset state), of course, the current antenna state and the current half-frame number may be nit preset to satisfy the requirement (the historical frequency offset state), which will not be limited by the embodiment of the present application herein.

Further preferably, in the embodiment, the inconsistency of the current antenna state and the historical antenna state is determined by the determination results of the current frequency offset state and historical frequency offset state, or, when the difference between the current half-frame number and the historical half-frame number does not matches the third threshold value, the historical frequency offset estimating value is set to be invalid.

In the embodiment, if the current frequency offset state is consistent with the historical frequency offset state, the following step 214 is performed; otherwise, the following step 216 is performed.

Step 214, adopting a frequency domain continuation compensation strategy to perform the pre-compensation to the fine frequency offset.

In the embodiment, a feasible frequency domain continuation compensation strategy may be implemented as follows: performing a frequency domain continuation to the historical frequency offset estimating value; according to the result of the frequency domain continuation, performing the pre-estimation to the fine frequency offset estimation. The following step 218 is performed after the pre-compensation.

Step 216, not performing the pre-compensation to the fine frequency offset estimation.

In the embodiment, if the current frequency offset state is inconsistent with the historical effective frequency offset state, and the current signal/noise ratio does not match the second threshold value, and the current frequency offset state is also inconsistent with the historical frequency offset state, then the compensation is not performed to the fine frequency offset estimation, the fine frequency offset estimation is performed directly, that is, the following step 218 is directly performed.

In one preferred embodiment of the present application, the method may further comprise:

Step 218, performing a fine frequency offset estimation and obtaining the fine frequency offset estimation result.

Step 220, obtaining a final frequency offset estimation result according to the fine frequency offset estimation result.

In the embodiment, the final frequency offset estimation result comprises but not limited to a final antenna state, a final half-frame number and a final frequency offset estimating value;

Step 222, determining whether a decoded data obtained after performing the final frequency offset estimation result is correct.

In the embodiment, if the decoded data is correct, the following step 224 is performed; otherwise, the following step 226 is performed.

Step 224, updating the historical effective frequency offset state according to the final antenna state, the final half-frame number and the final frequency offset estimating value.

Step 226, updating the historical frequency offset state according to the final antenna state, the final half-frame number and the final frequency offset estimating value.

In summary, the method for processing frequency offset described in the embodiment get a comparison between the current frequency offset state and the historical effective frequency offset state, and determine whether the current frequency offset state is consistent with a historical effective frequency offset state; if it is determined yes, performing a pre-compensation to a fine frequency offset estimation according to the historical effective frequency offset state. Since the historical effective frequency offset state is a frequency offset state corresponding to a correct decoding result, which guarantees the accuracy of the pre-compensation, and then the fine frequency offset estimation is performed after the pre-compensation according to the pre-compensation result, the problem of inaccurate or unacceptable frequency offset compensation due to the error of the coarse frequency offset estimation is overcome, the accuracy and stability of the frequency offset estimation are improved, and the complexity of the computation is reduced in a certain extent, and overall upstream throughput is improved in high-speed scenarios.

Secondly, in the embodiment, when it is ensured that the historical effective frequency offset estimation can be used, the coarse frequency offset estimation may be not performed, so the computational complexity is reduced, and the accuracy and stability of the frequency offset estimation are further improved.

In addition, in the embodiment, the frequency offset compensation scheme that matches the determination result may be selected through multiple determinations to perform pre-compensation, for example, when the current pilot frequency signal/noise ratio matches the second threshold value, a pre-compensation is performed to the amplitude-limiting result according to the coarse frequency offset estimation result, therefore the invalidation of the coarse frequency offset estimation is avoid. Furthermore, when the current pilot frequency signal/noise ratio does not match the second threshold value, a frequency domain continuation compensation strategy is provided in the embodiment, using the rules of the domain continuation compensation and the historical frequency offset estimating value to gain an accurate pre-compensation value and accurate frequency offset estimating value, when the coarse frequency offset estimation is invalid.

It should be known, for brief description, the aforementioned each embodiment of the method is described as the combination of a series of actions. However, it should be known by those skilled in the art that the present application is not limited by the described action sequence because certain steps may adopt other sequences or be performed simultaneously according to the present application. Secondly, it also should be known by those skilled in the art that the embodiments described in the specification are preferred embodiments and the involved actions are not necessary in the present application.

Third Embodiment

With reference to the above embodiments, this embodiment uses an actual example to describe the method for processing frequency offset.

Figure 3:
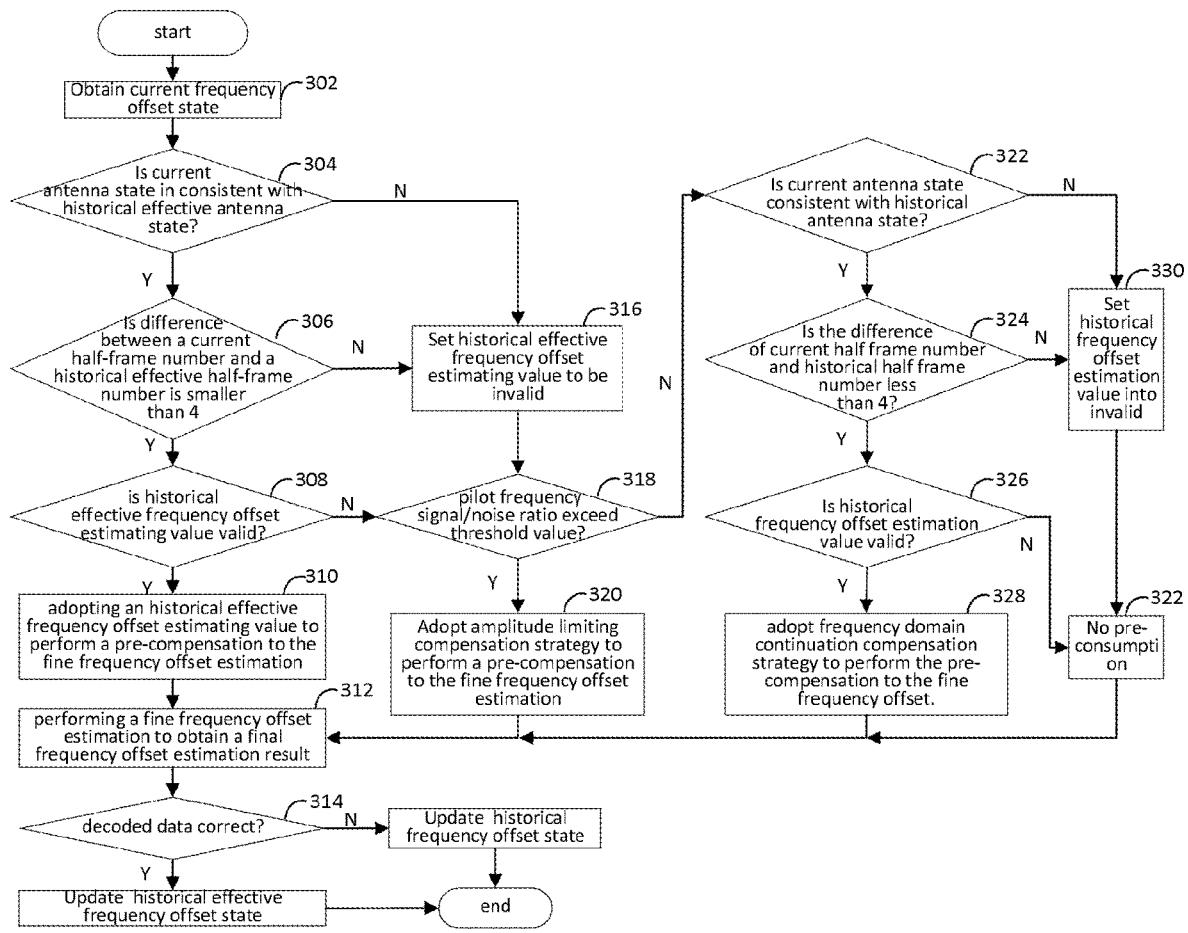
FIG. 3 is a flow path showing a method for processing frequency offset in a third embodiment of the present application.

With reference to FIG. 3, a flow chart of a method for processing frequency offset is shown and the method may comprise following detailed steps of:

Step 302, obtaining a current frequency offset state;

In the embodiment, current frequency offset state comprising: current antenna state and current half-frame number.

Step 304, determining whether a current antenna state is consistent with a historical effective antenna state.

In the embodiment, when the current antenna state is consistent with the historical effective antenna state, the following step 306 is performed.

Step 306, determining whether a difference between a current half-frame number and a historical effective half-frame number is smaller than 4.

In the embodiment, the foregoing first threshold value may be 4, when the difference between the current half-frame number and the historical effective half-frame number is smaller than 4, the difference between the current half-frame number and the historical effective half-frame number matches the first threshold value.

Step 308, determining whether a historical effective frequency offset estimating value is valid.

In the embodiment, the historical effective frequency offset estimating value may set to be invalid, therefore, it is necessary to determine the validity of the historical effective frequency offset estimating value. Preferably, if the historical valid frequency offset estimating value is valid, step 310 is performed.

Step 310, adopting an historical effective frequency offset estimating value to perform a pre-compensation to the fine frequency offset estimation.

Step 312, performing a fine frequency offset estimation to obtain a final frequency offset estimation result.

Step 314, determining whether a decoded data obtained after performing the final frequency offset estimation result is correct.

In the embodiment, if yes, updating the historical effective frequency offset state according to the final antenna state, the final half-frame number and the final frequency offset estimating value; if no, updating the historical frequency offset state according to the final antenna state, the final half-frame number and the final frequency offset estimating value In one preferred embodiment of the present application, if it is determined that the current antenna state is not consistent with the historical effective antenna state, according to the determination result of step 304, the following step 316 is performed. In addition, if it is determined that the difference between the current half-frame number and the historical valid half-frame number is larger than or equal to 4 according to the determination result of step 306, the following step 316 is performed.

Step 316, setting the historical effective frequency offset estimating value to be invalid.

Further preferably, the following step 318 may be performed after step 316. In addition, if it is determined that the historical effective valid frequency offset estimating value is invalid from step 308, the following step 318 is performed.

Step 318, determining whether a current pilot frequency signal/noise ratio is larger than or equal to 3 db.

In the embodiment, the aforementioned second threshold value is set to be 3 db. Preferably, if the current pilot frequency signal/noise ratio is larger than or equal to 3 db, the following step 320 is performed. Otherwise, the following step 322 is performed.

Step 320, adopting an amplitude limiting compensation strategy to perform a pre-compensation to the fine frequency offset estimation.

In the embodiment, the way of adopting an amplitude limiting compensation strategy to perform a pre-compensation to the fine frequency offset estimation comprises: performing a coarse frequency offset estimation, performing an amplitude-limiting on the result out of the actual frequency offset range.

In the embodiment, as shown in FIG. 3, step 312 may be performed after step 320.

Step 322, determining whether the current antenna state is consistent with the historical antenna state.

In the embodiment, when the current antenna state is consistent with the historical antenna state, step 324 is performed.

Step 324, determining whether the difference between the current half-frame number and the historical half-frame number is smaller than 4.

In the embodiment, the aforementioned third threshold value is set to be 4, when the difference between the current half-frame number and the historical frame number is smaller than 4, the difference between the current half-frame number and the historical frame number matches the third threshold value.

Step 326, determining whether historical frequency offset estimating value is valid.

In the embodiment, the historical frequency offset estimating value may set to be invalid, therefore, it is necessary to determine the validity of the historical frequency offset estimating value. Preferably, if the historical frequency offset estimating value is valid, step 328 is performed.

Step 328, adopting a frequency domain continuation compensation strategy to perform the pre-compensation to the fine frequency offset.

In the embodiment, the adopting a frequency domain continuation compensation strategy to perform the pre-compensation to the fine frequency offset comprises: performing a frequency domain continuation to the historical frequency offset estimating value; according to the result of the frequency domain continuation, performing the pre-estimation to the fine frequency offset estimation.

In the embodiment, as shown in FIG. 3, step 312 may be performed after step 328.

In another preferred embodiment of the present application, if it is determined that the current antenna state is not consistent with the historical antenna state from the determination result of step 322, the following step 330 is performed. In addition, if it is determined that the difference between the current half-frame number and the historical half-frame number is larger than or equal to 4 according to the determination result of step 324, the following step 330 is performed.

Step 330, setting the historical frequency offset estimating value to be invalid.

Further preferably, he following step 332 is performed after step 330. In addition, if it is determined from step 326 that the historical valid frequency offset estimating value is invalid, the following step 332 is performed.

Step 332, Not performing pre-compensation made for fine frequency offset estimation.

In the embodiment, as shown in FIG. 3, step 312 may be performed after step 332.

In summary, the method for processing frequency offset described in the embodiment get a comparison between the current frequency offset state and the historical effective frequency offset state, and determine whether the current frequency offset state is consistent with a historical effective frequency offset state; if it is determined yes, performing a pre-compensation to a fine frequency offset estimation according to the historical effective frequency offset state. Since the historical effective frequency offset state is a frequency offset state corresponding to a correct decoding result, which guarantees the accuracy of the pre-compensation, and then the fine frequency offset estimation is performed after the pre-compensation according to the result of the pre-compensation, the problem of inaccurate or unacceptable frequency offset compensation due to the error of the coarse frequency offset estimation is overcome, the accuracy and stability of the frequency offset estimation are improved, and the complexity of the computation is reduced in a certain extent, and overall upstream throughput is improved in high-speed scenarios.

Secondly, in the embodiment, when it is ensured that the historical effective frequency offset estimation can be used, the coarse frequency offset estimation may be nit performed, so the computational complexity is reduced, and the accuracy and stability of the frequency offset estimation are further improved.

In addition, in the embodiment, the frequency offset compensation scheme that matches the determination result may be selected through multiple determinations to perform pre-compensation, for example, when the current pilot frequency signal/noise ratio matches the second threshold value, a pre-compensation is performed to the amplitude-limiting result of the coarse frequency offset estimation, therefore the invalidation of the coarse frequency offset estimation is avoid. Furthermore, when the current pilot frequency signal/noise ratio does not match the second threshold value, a frequency domain continuation compensation strategy is provided in the embodiment, the rules of the domain continuation compensation and the historical frequency offset estimating value is used to gain an accurate pre-compensation value and accurate frequency offset estimating value, when the coarse frequency offset estimation is invalid.

Fourth Embodiment

Figure 4:
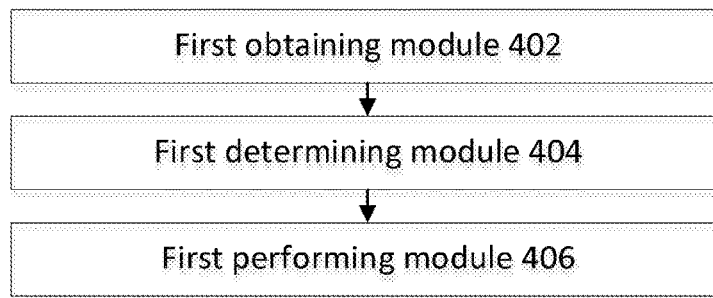
FIG. 4 is a block diagram showing a system for processing frequency offset according to a fourth embodiment of the present application.

Based on the same inventive concept as the above method embodiments, with reference to FIG. 4, a structure block diagram of a system for processing frequency offset is shown, the system comprises modules as follows.

A first obtaining module 402, which is configured to obtain a current frequency offset state.

A first determining module 404, which is configured to determine whether the current frequency offset state is consistent with a historical effective frequency offset state.

In the embodiment, the historical effective frequency offset state is a frequency offset state corresponding to a correct decoding result.

A first performing module 406, which is configured to, if the current frequency offset state is consistent with the historical frequency offset state, perform a pre-compensation to a fine frequency offset estimation according to the historical effective frequency offset state.

In the embodiment, preferably, the first determining module 404 may be specifically configured to: determine whether a current antenna state is consistent with a historical effective antenna state; and determine whether a difference between a current half-frame number and a historical effective half-frame number matches a first threshold value; and determine whether a historical effective frequency offset estimating value is set to be invalid. The current frequency offset state comprises: the current antenna state and the current half-frame number, the historical effective frequency offset state comprises: the historical effective antenna state, the historical effective half-frame number and the historical effective frequency offset estimating value. The first performing module 406 is configured to, use the historical effective frequency offset estimating value to perform the pre-compensation to the fine frequency offset estimation.

Figure 5:
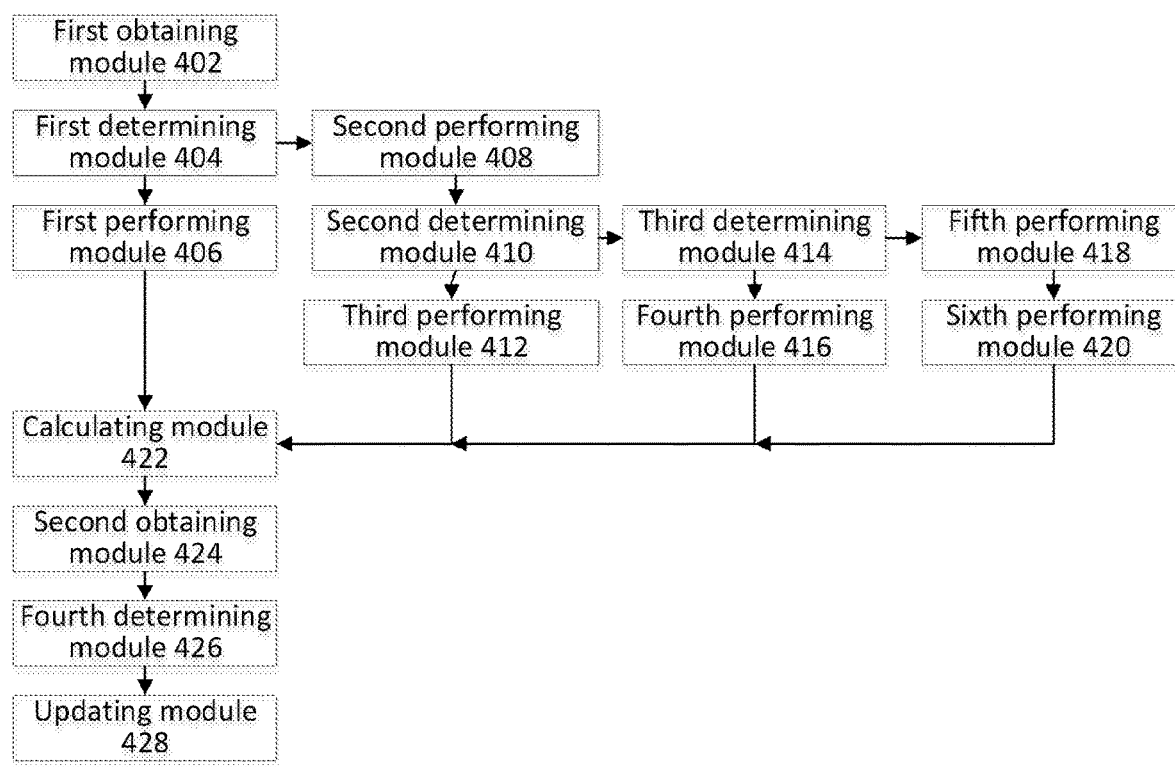
FIG. 5 is a block diagram showing a preferred system for processing frequency offset according to a fourth embodiment of the present application.

As shown in FIG. 5, a structure block diagram of a system for processing frequency offset is shown. In the embodiment, the system for processing frequency offset may further include modules as follows.

A second performing module 408, which is configured to, if the current antenna state is not consistent with the historical effective antenna state, or the difference between the current half-frame number and the historical effective half-frame number does not match the first threshold value, set the historical effective frequency offset estimating value to be invalid.

Preferably, the system may further include:
a second determining module 410, configured to, if the current frequency offset state is not consistent with the historical effective frequency offset state, determine whether a current pilot frequency signal/noise ratio matches a second threshold value; a third performing module 412, configured to, if the current pilot frequency signal/noise ratio matches a second threshold value, adopt an amplitude limiting compensation strategy to perform a pre-compensation to the fine frequency offset estimation. Further, when the third performing module 412 performs the operation of adopting an amplitude limiting compensation strategy to perform a pre-compensation to the fine frequency offset estimation, the operation may comprise: performing a coarse frequency offset estimation, and perform an amplitude-limiting on the result exceeding the actual frequency offset range; and according to the amplitude-limiting result, perform an amplitude-limiting to the fine frequency offset estimation.

Preferably, the system may further include:
a third determining module 414, configured to determine if the current frequency offset state is consistent with the historical frequency offset state when the pilot frequency signal/noise ratio does not match the second threshold value; a fourth performing module 416, configured to, if the current frequency offset state is consistent with a historical frequency offset state, adopt a frequency domain continuation compensation strategy to perform the pre-compensation to the fine frequency offset. Furthermore, preferably, the third determining module 414 is configured to determine whether the current antenna state is consistent with the historical antenna state; and determine whether the difference between the current half-frame number and the historical frame number matches a third threshold value; and determine whether the historical frequency offset estimating value is set to be invalid. Wherein the current frequency offset state comprises: the current antenna state and the current half-frame number; the historical frequency offset state comprises: the historical antenna state, the historical half-frame number and the historical frequency offset estimating value. When the fourth performing module 416 performs the operation of adopting a frequency domain continuation compensation strategy to perform the pre-compensation to the fine frequency offset, the operation may comprise: performing a frequency domain continuation to the historical frequency offset estimating value; according to the result of the frequency domain continuation, performing the pre-estimation to the fine frequency offset estimation.

Preferably, the system may further include:
a fifth performing module 418, configured to, if the current antenna state is not in consistent with the historical antenna state, or the difference between the current half-frame number and the historical half-frame number does not match the third threshold value, set the historical frequency offset estimating value to be invalid.

Preferably, the system may further include:
a sixth performing module 420, configured to, if the current antenna state is not in consistent with the historical antenna state, not perform the pre-compensation to the fine frequency offset estimation.

Preferably, the system may further include:
a calculating module 422, configured to, perform the fine frequency offset estimation, and obtain the fine frequency offset estimation result; a second obtaining module 424, configured to obtain a final frequency offset estimation result according to the fine frequency offset estimation result; wherein the final frequency offset estimation result comprises: a final antenna state, a final half-frame number and a final frequency offset estimating value; a fourth determining module 426, configured to determine whether a decoded data obtained after performing the final frequency offset estimation result is correct; an updating module 428, configured to, if the decoded data is correct, update the historical effective frequency offset state according to the final antenna state, the final half-frame number and the final frequency offset estimating value; and if the decoded data is incorrect, update the historical frequency offset state according to the final antenna state, the final half-frame number and the final frequency offset estimating value.

In summary, the system for processing frequency offset described in the embodiment get a comparison between the current frequency offset state and the historical effective frequency offset state, and determine whether the current frequency offset state is consistent with a historical effective frequency offset state; if it is determined yes, performing a pre-compensation to a fine frequency offset estimation according to the historical effective frequency offset state. Since the historical effective frequency offset state is a frequency offset state corresponding to a correct decoding result, which guarantees the accuracy of the pre-compensation, and then the fine frequency offset estimation is performed after the pre-compensation according to the result of the pre-compensation, the problem of inaccurate or unacceptable frequency offset compensation due to the error of the coarse frequency offset estimation is overcome, the accuracy and stability of the frequency offset estimation are improved, and the complexity of the computation is reduced in a certain extent, and overall upstream throughput is improved in high-speed scenarios.

Secondly, in the embodiment, when it is ensured that the historical effective frequency offset estimation can be used, the coarse frequency offset estimation may be nit performed, so the computational complexity is reduced, and the accuracy and stability of the frequency offset estimation are further improved.

In addition, in the embodiment, the frequency offset compensation scheme that matches the determination result may be selected through multiple determinations to perform pre-compensation, for example, when the current pilot frequency signal/noise ratio matches the second threshold value, a pre-compensation is performed to the amplitude-limiting result of the coarse frequency offset estimation, therefore the invalidation of the coarse frequency offset estimation is avoid. Furthermore, when the current pilot frequency signal/noise ratio does not match the second threshold value, a frequency domain continuation compensation strategy is provided in the embodiment, the rules of the domain continuation compensation and the historical frequency offset estimating value is used to gain an accurate pre-compensation value and accurate frequency offset estimating value, when the coarse frequency offset estimation is invalid.

The device embodiments are basically similar as the method embodiment, so that the description is relatively simple, the related part may be referred to the method embodiments.

The embodiment of the present application also discloses a computer-readable recording medium on which a program for executing the above method is recorded.

The computer-readable recording medium includes any mechanism for storing or transmitting information in a form readable by a computer (e.g., a computer). For example, a machine-readable medium includes read-only memory (ROM), random-access memory (RAM), magnetic disk storage media, optical storage media, flash-memory storage media, electrical, optical, acoustical, or other forms of propagated signals (e.g, carrier waves, infrared signals, digital signals, etc.)

Each embodiment in this specification is described in a progressive manner, and each embodiment focuses on the differences from other embodiments, and the same or similar parts among the embodiments can be referred to each other.

The method and system for processing frequency offset provided by the present application are described in detail above. Specific examples are used herein to describe the principle and implementation manners of the present application. The above embodiments are only used to help understand the present application. The methods and their core ideas are also discussed. For those skilled in the art, based on the idea of the present application, there will be changes in specific implementation manners and application ranges. In summary, the contents of this specification should not be construed as limitations to this application.

What is claimed is:

1. A method for processing frequency offset, comprising:
   obtaining a current frequency offset state;
   determining whether the current frequency offset state is consistent with a historical effective frequency offset state; wherein the historical effective frequency offset state is a frequency offset state corresponding to a correct decoding result;
   if it is determined yes, performing a pre-compensation to a fine frequency offset estimation according to the historical effective frequency offset state, wherein a step of determining whether the current frequency offset state is consistent with the historical effective frequency offset state comprises:
   determining whether a current antenna state is consistent with a historical effective antenna state; and
   determining whether a difference between a current half-frame number and a historical effective half-frame number matches a first threshold value; and
   determining whether a historical effective frequency offset estimating value is set to be invalid;
   wherein the current frequency offset state comprises: the current antenna state and the current half-frame number, the historical effective frequency offset state comprises: the historical effective antenna state, the historical effective half-frame number and the historical effective frequency offset estimating value.

2. The method according to claim 1, wherein the step of performing the pre-compensation to the fine frequency offset estimation according to the historical effective frequency offset state comprises:
   using the historical effective frequency offset estimating value to perform the pre-compensation to the fine frequency offset estimation.

3. The method according to claim 1, wherein if the current antenna state is not consistent with the historical effective antenna state, or the difference between the current half-frame number and the historical effective half-frame number does not match the first threshold value, setting the historical effective frequency offset estimating value to be invalid.

4. The method according to claim 1, further comprising:
   if the current frequency offset state is not consistent with the historical effective frequency offset state, determining whether a current pilot frequency signal/noise ratio matches a second threshold value; if yes, adopting an amplitude limiting compensation strategy to perform a pre-compensation to the fine frequency offset estimation.

5. The method according to claim 4, wherein adopting the amplitude limiting compensation strategy to perform the pre-compensation to the fine frequency offset estimation comprises:
   performing a coarse frequency offset estimation to obtain a coarse frequency offset estimation result;
   determining whether the coarse frequency offset estimation result matches actual frequency offset range; if yes, performing the pre-compensation to the fine frequency offset estimation according to the coarse frequency offset estimation result; if no, performing an amplitude-limiting on the coarse frequency offset estimation result to obtain an amplitude-limiting result, and performing the pre-compensation to the fine frequency offset estimation according to the amplitude-limiting result.

6. The method according to claim 4, further comprising:
   if the current pilot frequency signal/noise ratio does not match the second threshold value, determining whether the current frequency offset state is consistent with a historical frequency offset state ;
   if yes, adopting a frequency domain continuation compensation strategy to perform the pre-compensation to the fine frequency offset.

7. The method according to claim 6, wherein determining whether the current frequency offset state is consistent with the historical frequency offset state comprises:
   determining whether the current antenna state is consistent with the historical antenna state; and
   determining whether the difference between the current half-frame number and the historical frame number matches a third threshold value; and determining whether the historical frequency offset estimating value is set to be invalid;
wherein the current frequency offset state comprises: the current antenna state and the current half-frame number; the historical frequency offset state comprises: the historical antenna state, the historical half-frame number and the historical frequency offset estimating value.

8. The method according to claim 7, further comprising:
if the current antenna state is not in consistent with the historical antenna state, or the difference between the current half-frame number and the historical half-frame number does not match the third threshold value, setting the historical frequency offset estimating value to be invalid.

9. The method according to claim 1, further comprising:
performing the fine frequency offset estimation and obtaining a fine frequency offset estimation result;
obtaining a final frequency offset estimation result according to the fine frequency offset estimation result; wherein the final frequency offset estimation result comprises: a final antenna state, a final half-frame number and a final frequency offset estimating value;
determining whether a decoded data obtained after performing the final frequency offset estimation result is correct;
if yes, updating the historical effective frequency offset state according to the final antenna state, the final half-frame number and the final frequency offset estimating value;
if no, updating the historical frequency offset state according to the final antenna state, the final half-frame number and the final frequency offset estimating value.

10. A computing device, comprising:
a memory having instructions stored thereon;
a processor configured to execute the instructions to perform operations for processing frequency offset, the operations comprising:
obtaining a current frequency offset state;
determining whether the current frequency offset state is consistent with a historical effective frequency offset state; wherein the historical effective frequency offset state is a frequency offset state corresponding to a correct decoding result;
if it is determined yes, performing a pre-compensation to a fine frequency offset estimation according to the historical effective frequency offset state, wherein the operation of determining whether the current frequency offset state is consistent with the historical effective frequency offset state comprises:
determining whether a current antenna state is consistent with a historical effective antenna state; and
determining whether a difference between a current half-frame number and a historical effective half-frame number matches a first threshold value; and
determining whether a historical effective frequency offset estimating value is set to be invalid;
wherein the current frequency offset state comprises: the current antenna state and the current half-frame number, the historical effective frequency offset state comprises: the historical effective antenna state, the historical effective half-frame number and the historical effective frequency offset estimating value.

11. The computing device according to claim 10, wherein the operation of performing the pre-compensation to the fine frequency offset estimation according to the historical effective frequency offset state comprises:
using the historical effective frequency offset estimating value to perform the pre-compensation to the fine frequency offset estimation.

12. The computing device according to claim 10, the operations further comprising:
if the current antenna state is not consistent with the historical effective antenna state, or the difference between the current half-frame number and the historical effective half-frame number does not match the first threshold value, setting the historical effective frequency offset estimating value to be invalid.

13. The computing device according to claim 10, the operations further comprising:
if the current frequency offset state is not consistent with the historical effective frequency offset state, determining whether a current pilot frequency signal/noise ratio matches a second threshold value;
if the current pilot frequency signal/noise ratio matches the second threshold value, adopting an amplitude limiting compensation strategy to perform the pre-compensation to the fine frequency offset estimation.

14. The computing device according to claim 13, wherein the operation of adopting an amplitude limiting compensation strategy to perform the pre-compensation to the fine frequency offset estimation comprises:
performing a coarse frequency offset estimation to obtain a coarse frequency offset estimation result;
determining whether the coarse frequency offset estimation result matches actual frequency offset range; if yes, performing the pre-compensation to the fine frequency offset estimation according to the coarse frequency offset estimation result; if no, performing an amplitude-limiting on the coarse frequency offset estimation result to obtain an amplitude-limiting result, and performing the pre-compensation to the fine frequency offset estimation according to the amplitude-limiting result.

15. The computing device according to claim 13, the operations further comprising:
if the current pilot frequency signal/noise ratio does not match the second threshold value, determining whether the current frequency offset state is consistent with a historical frequency offset state ;
if the current frequency offset state is consistent with the historical frequency offset state, adopting a frequency domain continuation compensation strategy to perform the pre-compensation to the fine frequency offset.

16. The computing device according to claim 15, wherein the operation of determining whether the current frequency offset state is consistent with the historical frequency offset state comprises: determining whether the current antenna state is consistent with the historical antenna state; and determining whether the difference between the current half-frame number and the historical frame number matches a third threshold value; and determining whether the historical frequency offset estimating value is set to be invalid;
wherein the current frequency offset state comprises: the current antenna state and the current half-frame number; the historical frequency offset state comprises: the historical antenna state, the historical half-frame number and the historical frequency offset estimating value.

17. The computing device according to claim 16, the operations further comprising:
if the current antenna state is not in consistent with the historical antenna state, or the difference between the current half-frame number and the historical half-frame number does not match the third threshold value, setting the historical frequency offset estimating value to be invalid.

18. A non-transitory computer readable medium having computer programs stored thereon that, when executed by one or more processors of a computing device, cause the computing device to perform operations for processing frequency offset, the operations comprising:

obtaining a current frequency offset state;

determining whether the current frequency offset state is consistent with a historical effective frequency offset state; wherein the historical effective frequency offset state is a frequency offset state corresponding to a correct decoding result;

if it is determined yes, performing a pre-compensation to a fine frequency offset estimation according to the historical effective frequency offset state, wherein an operation of determining whether the current frequency offset state is consistent with the historical effective frequency offset state comprises:

determining whether a current antenna state is consistent with a historical effective antenna state; and determining whether a difference between a current half-frame number and a historical effective half-frame number matches a first threshold value; and determining whether a historical effective frequency offset estimating value is set to be invalid;

wherein the current frequency offset state comprises: the current antenna state and the current half-frame number, the historical effective frequency offset state comprises: the historical effective antenna state, the historical effective half-frame number and the historical effective frequency offset estimating value.

* * * * *